United States Patent

Kokkila

[19]

[11] Patent Number: 6,065,673
[45] Date of Patent: May 23, 2000

[54] METHOD AND APPARATUS FOR PERFORMING CURRENCY CONVERSIONS

[75] Inventor: Tapio Kokkila, Turku, Finland

[73] Assignee: Telefonaktiebolaget L M Ericsson AB, Stockholm, Sweden

[21] Appl. No.: 08/991,724

[22] Filed: Dec. 16, 1997

[30] Foreign Application Priority Data

Dec. 18, 1996 [FI] Finland ................................ 965091

[51] Int. Cl.[7] ....................................................... G06F 17/60
[52] U.S. Cl. ............................................ 235/379; 455/408
[58] Field of Search ................................... 235/379, 380, 235/381, 383, 492; 902/25; 455/405, 406, 407, 408, 409

[56] References Cited

U.S. PATENT DOCUMENTS

| | | | |
|---|---|---|---|
| 4,092,523 | 5/1978 | Tava et al. | 341/88 |
| 4,766,293 | 8/1988 | Boston | 235/379 |
| 5,038,374 | 8/1991 | Kaufman et al. | 379/98 |
| 5,109,401 | 4/1992 | Hattori et al. | 455/407 |
| 5,303,297 | 4/1994 | Hillis | 455/406 |
| 5,550,915 | 8/1996 | Partridge, III | 379/355 |

FOREIGN PATENT DOCUMENTS

| | | |
|---|---|---|
| 44 15 966A | 11/1995 | Germany . |
| 8-147245 | 6/1996 | Japan . |
| 10-084435 | 3/1998 | Japan . |
| WO 93/12604 | 6/1993 | WIPO . |
| WO 95/15545 | 6/1995 | WIPO . |

OTHER PUBLICATIONS

Hellaker, et al: "Real–time Traveller Information'in Everyone's pocket?'a pilot test using hand–portable GSM terminals;" IEE Vehicle Navigation & Information Systems Conference; Oct. 12, 1993; Ottawa, CA; pp. 49–52.

PCT International Search Report; Apr. 9, 1998; McDonagh, F.

Examiner Kimmo Pirinen, Application No. 965091, Finnish Office Action dated Nov. 20, 1997 (untranslated).

Examiner Kimmo Pirinen, Application No. 965091, Finnish Office Action dated Nov. 20, 1997 (translated—Abstract only).

Primary Examiner—Donald Hajec
Assistant Examiner—Jared J. Fureman
Attorney, Agent, or Firm—Jenkens & Gilchrist, P.C.

[57] ABSTRACT

The invention relates to a method, an apparatus and an arrangement for calculating the value of an amount in a first currency in terms of a desired second currency. The method comprises the steps of entering the value of an amount in the first currency into a controller of a receiver. A scaling factor describing a conversion between at least two different public land mobile network (PLMN) units is retrieved from a memory within the receiver. The amount of the first currency is then converted to the equivalent amount of the second currency by the controller which is adapted to use the scaling factor for the conversion. Finally, a user interface of the receiver is used to inform the user of the conversion result. The apparatus performing the inventive method is included in a mobile station and the arrangement is included in a PLMN.

12 Claims, 2 Drawing Sheets

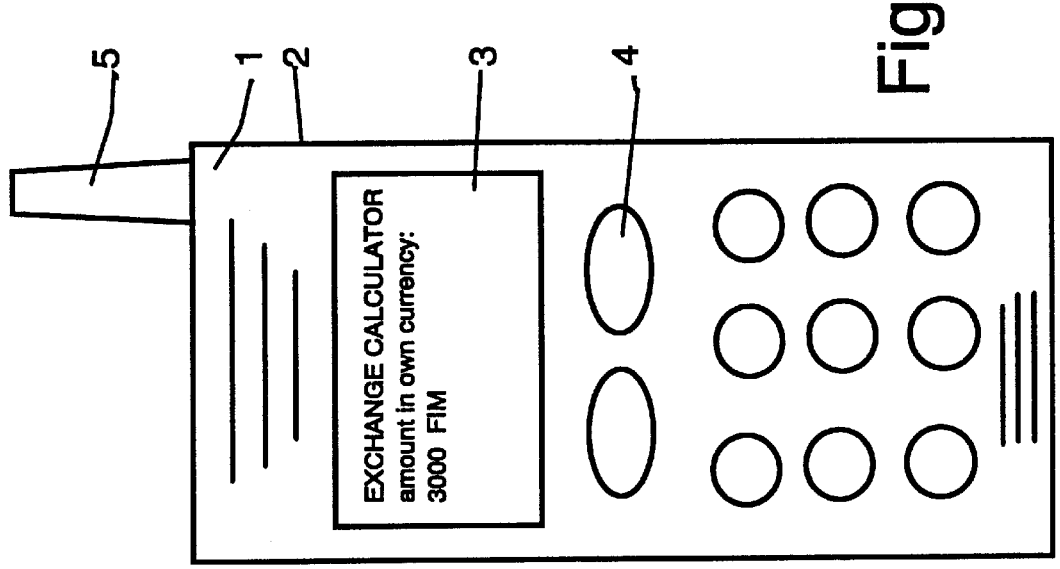
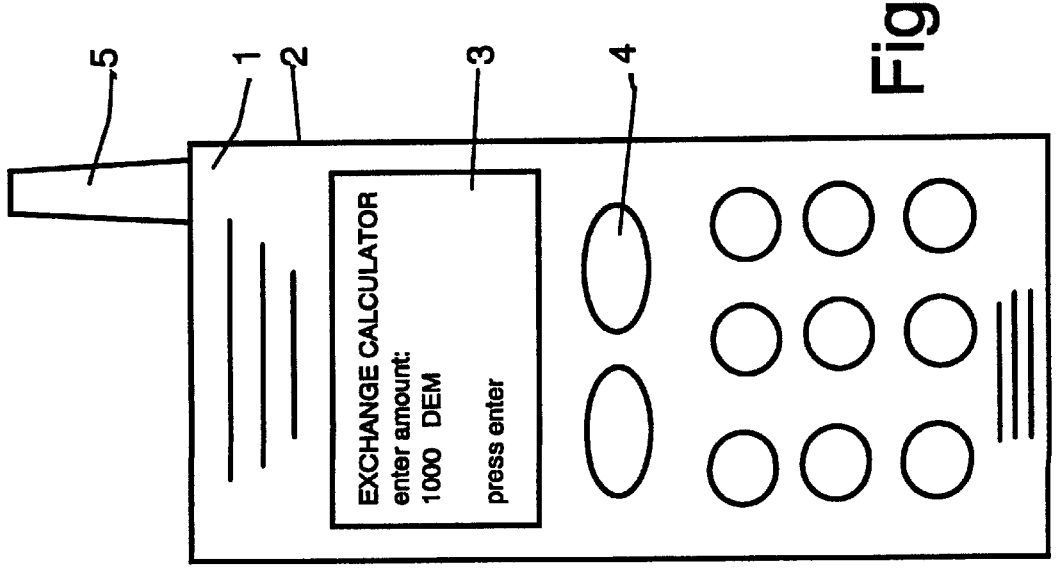

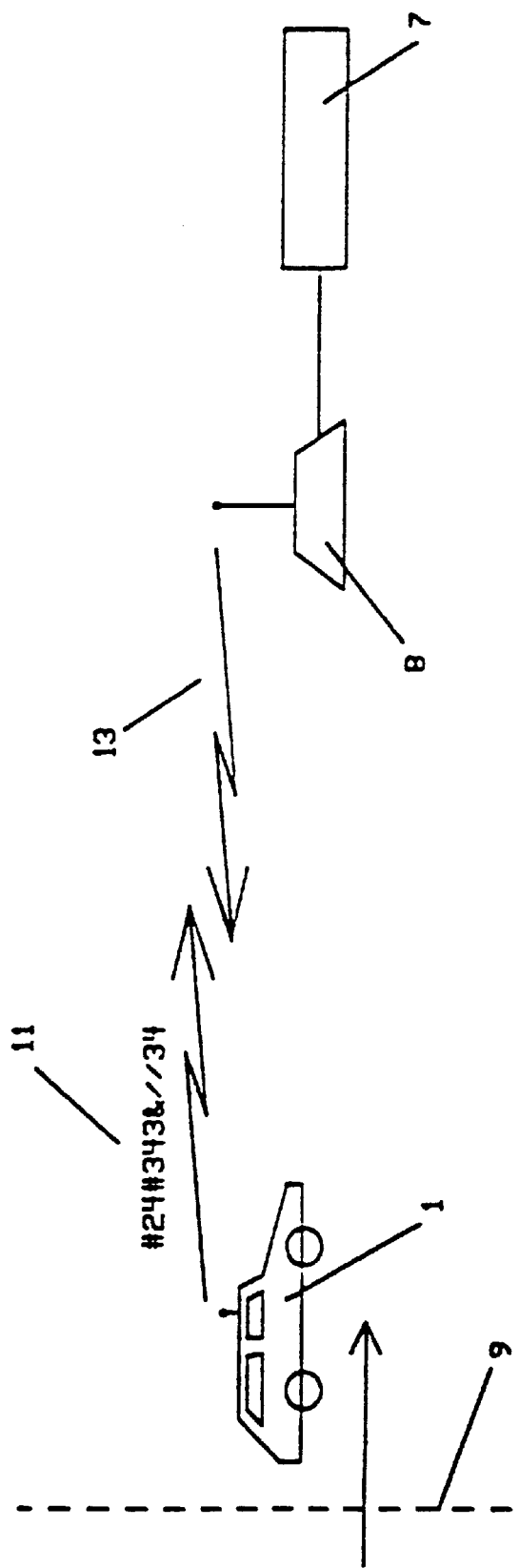

METHOD AND APPARATUS FOR PERFORMING CURRENCY CONVERSIONS

FIELD OF THE INVENTION

The present invention relates to a method of calculating the value of an amount in a first currency in terms of a desired second currency, and more precisely, to a method for obtaining a given price in another currency by means of a mobile station. The invention relates further to an apparatus and an arrangement realizing the inventive method.

BACKGROUND OF THE INVENTION

When being abroad it is a common problem for the travellers to be able to estimate and/or calculate the prices in their own home currency they are more familiar with. To facilitate this various exchange rate scales or tables and similar simple mechanical means and electronic calculators, even programmable ones, are known.

These do, however, have some disadvantages. The tables and similar tend to be out of date quite soon due to fluctuations in exchange rates. The same is true for the calculators having reprogrammed exchange rates stored in the memory means thereof. A further problem relies on the fact that the traveller needs to carry such table, scale or calculator with him or her, which means one further thing to remember to take with and to take care of.

Due to the fact that mobile telephones have become and are still becoming more and more popular, even the travellers, and especially those travelling for business purposes do have a mobile station with them when they are abroad, as it is even possible to use the same mobile telephone or station when being abroad as is used at home. Analog and digital mobile telephones as well as mobile telephone networks and apparatus and equipment belonging to those are well known by the skilled person, and thus not explained in more detail. In this description the term 'network' in general means all such means required to run a network, and thus it is intented to include, among other things, operators, exchanges, switches, base stations and similar. The term 'home network' means the network in which the user is a subscriber. The term 'local network' means the network in which the user is at the present, and may be either the home network or a foreign network.

ETSI (European Telecommunications Standards Institute) specification GSM 02.86 (ETS 300 519: European digital telecommunications system (Phase 2); Advise of Charge (AoC) supplementary services—Stage 1), December 1995, discloses main principles and features of an 'Advice of Charge' (AoC) service and is incorporated herein by reference.

Said AoC service provides the subscriber with an information indicating an estimated cost of a call or a service used, ie. a cost for every applicable usage of telecommunications services. The AoC service is subscribed from a service provider, such as from the home network operator, who activates said AoC service.

The users have found this service useful when they are estimating the actual costs caused by the usage of the mobile telephone. The costs are always expressed in home units, the value of which is defined and published by the HPLMN (Home Public Land Mobile Network) regardless of the LPLMN (Local Public Land Mobile Network) in which the costs were incurred or regardless of the call direction or regardless of the type of call including supplementary service and data calls. In other words, this service is not capable of making any calculations between various currencies.

Another ETSI specification GSM 02.24 (ETS 300 510: European digital cellular tele-communications system (Phase 2); Description of Charge Advise Information (CAI)), August 1995, and ETSI specification GSM 04.86 (ETS 300 570: European digital cellular telecommunications system (Phase 2); Advise of Charge (AoC) supplementary services—Stage 3), November 1994, describe a 'Charge Advice Information' (CAI) service. These specifications are also incorporated herein as a reference.

The CAI service provides several additional features to the AoC, such as more precise information about the calls and the costs. The mobile telephone or mobile station is supplied with the necessary CAI information at the charging point on a per call basis within a signalling message over the radio interference. The mobile telephone uses the CAI information to compute the AoC value for the relevant call. Thus the signalling CAI not only provides the charging information, but indicates also the charging point and hence initiates the timing of the chargeable duration. According to this specification the information sent to the mobile telephone consists of seven elements as is disclosed in the following table:

TABLE 1

| Element | Dimension | Description |
| --- | --- | --- |
| e1 | u/i | Units / interval |
| e2 | t/i | Seconds / time interval |
| e3 | — | Scaling factor |
| e4 | u | Unit increment |
| e5 | u/d | Units / data interval |
| e6 | seg/d | Segments / data interval |
| e7 | t/i | initial seconds / time interval |

From the above the element e3 defines a scaling factor for conversions from LPLMN units to HPLMN units, said element e3 being a dimensionless multiplier. The e3 is set according to variables of the LPLMN and the relevant HPLMN. If the LPLMN is the HPLMN, ie. the mobile telephone is in the home network, e3 will be simplified to unity. The e3 element of the CAI allows the mobile telephone to calculate the costs of a call in a currency chosen by the subscriber. The specification defines also a PUCT (Price per Unit and Currency Table), which is the value of the home unit in a currency chosen by the subscriber and being stored in a SIM (Subscriber Identity Module) of the mobile telephone. The subscriber may set the currency value corresponding the value of the home unit differently in the PUCT to the value of the unit published by the HPLMN in order to cover extra cost. An indication of the currency is part of the PUCT.

However, the above services do not give any help in view of prices or costs other than caused by making a telephone call or using other services provided by means of the mobile station.

SUMMARY OF THE INVENTION

It is an object of the present invention to provide a new type of solution for the conversions between different currencies.

An object of the present invention is also to provide a method and arrangement by which the conversions between different currencies can be performed by means of a mobile telephone.

An object of the present invention is also to provide a method and arrangement by which the calculations can be performed by using updated exchange rates.

An another object of the present invention is to provide a method and an arrangement, by means of which a user of a mobile telephone can be provided with information of latest exchange rates.

Other objects and advantages of the present invention will be brought out in the following part of the specification taken in conjunction with the accompanying drawings.

According to the present invention, the objects are obtained by providing a method of calculating the value of an amount in a first currency in terms of a desired second currency. Said method comprises the steps of entering the value of an amount in a first currency in control means of a receiver, retrieving a scaling factor from memory means of said receiver, said scaling factor describing a conversion between at least two different PLMN units, converting said amount of said first currency to the equivalent amount of said second currency by said control means adapted to use said scaling factor for the conversion, and informing the user of the conversion result by means of an user interface of the receiver.

A mobile station according to the present invention comprises control means, memory means for storing a scaling factor describing a conversion ratio between at least two PLMN units, means for entering an amount in a first currency into said control means, said control means being adapted to retrieve said scaling factor from the memory means and to convert said amount in said first currency to an equivalent amount of a desired second currency by means of said scaling factor, and an user interface operationally connected to said control means and arranged to provide the user with appropriate information.

According to the present invention, an arrangement in public land mobile networks (PLMN) in which at least one mobile station is a subscriber, comprises means for generating, storing and transmitting a scaling factor to said mobile station, said mobile station including means for receiving an amount given in a first currency and control means operationally connected therein, wherein said control means are adapted to convert said amount given in a first currency to an equivalent amount in a second currency by using said scaling factor for the conversion, and user interface means for informing the user of the results of said conversion.

Several advantages are obtained by means of the present invention. The solution provides a simple, reliable and software controllable manner for calculating the prices in various currencies. The invention relieves the traveller from carrying with him/her other means for calculating prices in various currencies than the mobile station he/she already has. In addition, the user is provided with a possibility to utilize updated exchange rates.

In the following the present invention and the other objects and advantages thereof will be described by way of examples with reference to the annexed drawings, in which similar reference characters throughout the various figures refer to similar features. It should be understood that the following exemplifying description of the invention is not meant to restrict the invention to the specific forms presented in this connection but rather the present invention is meant to cover all modifications, similarities and alternatives which are included in the spirit and scope of the present invention, as defined by the appended claims.

BRIEF DESCRIPTION OF THE DRAWINGS

FIGS. 1a and 1b are schematic views of possible mobile telephone displays according to the presen invention;

FIG. 2 discloses schematically one embodiment of the present invention.

DETAILED DESCRIPTION OF THE DRAWINGS

FIGS. 1a and b disclose a schematical presentation of a mobile telephone 1 including a housing 2, a display 3, control buttons or keying means 4 and an antenna 5. For the reasons of clarity, the essential internal parts of the mobile telephone 1, such as circuit boards including software-based control means, such as CPU (Central Processing Unit), as well as memory means, such as ROM or RAM memories or a fixed internal memory or a SIM card memory and I/O means (Input/Output means) for the above, are not shown. All these components of a mobile telephone are per se known by the skilled person, and thus not explained in more detail herein.

The inventive telephone of FIGS. 1a and b comprises a special menu option "EXCHANGE CALCULATOR", which is shown to be selected in FIG. 1a. The user (not shown) has dialled by the keypad 4 an exemplary amount of 1000 DEM, and the display 3 asks to confirm the amount by pressing enter. It is to be noted that this key could be any appropriate key, such as "OK", "YES" etc. button known by the skilled person. In addition, other means, such as voice recognition or touch screen, could be used for introducing the amount. As the mobile phone is already informed about the network used (see FIG. 2), and thus the country in which it is used, it may automatically assume the currency which is used in that particular country. The arrangement may be such that the mobile phone has this currency as a default.

As can be readily seen from the FIG. 1b, the display 3 subsequently shows the same amount in other currency, for instance in the user's own currency. The conversion is performed by the mobile telephone software, wherein the software utilizes a scaling factor (element e3 of the CAI service described above), by which the entered amount is multiplied for obtaining the same amount in home units.

Said element e3 is a dimensionless multiplier and defines the scaling factor which can be used for conversions from local PLMN units to home PLMN units. At present the value range thereof has been defined as 0–81.91, the resolution thereof being 0.01. However, these values are subject for changes and may thus vary from the above values.

As was explained, e3 is one of the CAI elements, which in turn is defined in the analysis tree of an exchange. The scaling factor, ie. element e3, is obtained from that analysis tree. The following commands might be used when utilizing the invention for the handling of the AoC analysis tree in the exchange:

| | |
|---|---|
| - MGCCI: | Mobile Telephony, Advice of Charge Currency Rate, Initiate |
| - MGCCE: | Mobile Telephony, Advice of Charge Currency Rate, End |
| - MGCCC: | Mobile Telephony, Advice of Charge Currency Rate, Change |
| - MGCCP: | Mobile Telephony, Advice of Charge Currency Rate, Print |

From the above commands, the e3 element for converting the local PLMN units to home PLMN units is defined by command MGCCI. In case e3 equals with 1, there will be no conversion as there is no difference between the exchange rates of the two currencies in question.

Therefore the exchange calculator according to the present invention utilizes a call related Supplementary Service (SS) invocations provided to a Mobile Subscriber (MS), and the desired modifications to the already existing hardware and software of the mobile telephone networks are easy for the skilled person to perform after reading this specification of the present invention.

It is to be noted that the form, texts and/or messages shown by the display 3 are not restricted to those shown by FIGS. 1a and b, but can be of any suitable form, and that these are only examples given to facilitate the understanding of the invention and not to limit the scope thereof.

It is also to be noted that even though the mobile station is disclosed as a mobile telephone 1, many other types of mobile units can be readily utilized in connection with the invention. The mobile unit may, for instance, be in a form of a simple receiver which is adapted to receive the scaling factor e3, and is thus capable of performing the desired calculations between various currencies.

FIG. 2 is a schematic representation of one preferred embodiment according to the present invention. A vehicle including a mobile telephone unit 1 crosses border line 9, which essentially equals with the local operator area and thus enters a net of a local operator controlled by a switch means 7. The mobile telephone unit 1 informs the local operator ie. the switch means 7 of said entrance by sending a signal 11 to the local operator switch 7 through a base station 8. The HLR (Home Location Register) or VLR (Visitor Location Register) or functionally similar part of the switch 7 will register any new mobile telephone unit entering the net either because of roaming or switching on the telephone after having already entered the net and/or communicates at this stage with the home operator of the mobile phone unit 1 to receive any additional information which might be required.

At this point a scaling factor e3 (or even several scaling factors) will be transmitted back to mobile telephone unit 1 together with other CAI information elements (e1–e7) as was described above by signal 13. The scaling factor element(s) e3 will then be stored into the memory means, such as SIM card or fixed memory or random memory means of the mobile telephone unit 1 to be used by the control means or program in an appropriate manner, as explained above in connection with FIGS. 1a and b.

To perform the above, the local PLMN analyzes the IMSI (International Mobile Subscriber Identity) which comprises a MCC (Mobile Country Code; 3 digits), a MNC (Mobile Network Code; 1–2 digits) and a MSIN (Mobile Subscriber Identification Number) of the mobile user in the PLMN at which the user is located at that given time in order to be able to send said scaling factor e3 of that particular area to the mobile telephone to be stored in the memory means thereof.

The scaling factor can be introduced to the mobile telephone at the time the user, who has entered for that given currency area, calls for the first time by his or hers telephone.

According to one alternative, the scaling factor is sent to the telephone as soon as the local network has detected a new foreign mobile telephone which as entered the network area.

It will be understood by the skilled person that a network includes all required apparatus and function not described in more detail herein. The network includes apparatus such as exchange(s), switch(es), trunk(s), base station(s) etc. and operator(s) running the net. In this context the term network can also be understood as a combination of several local networks, as the arrangement may consist of one network or few networks only, or from a plurality of networks forming a global system.

Other alternative displays and/or services than those shown and described above can also be provided by the invention. For example, the user may want to know the most recent exchange rates. For this purpose he or she selects a menu option "exchange rate", after which the display shows the latest updated rate. The display can also show, simultaneously or in a predetermined order, all the information related to the conversions, for example the used scaling factor, currency code corresponding the first currency ie. the currency introduced to the telephone by the user, and the corresponding amount in second currency and the code of said second currency.

According to one embodiment the arrangement according to the present invention includes an automatic updating feature, according to which the e3 element will be updated, for instance, once in a given time period, such as once a day, or when such changes in the exchange rates occur which are exceeding predetermined limits for allowable changes. This might be arranged such that the telephone unit is adapted to request an update after a predetermined time period or such that the network means are including control means which automatically provide the mobile phone(s) with the necessary updating information.

According to an alternative the user may request an update to the exchange rates by selecting a MENU-option "update exchange rate". In this case the telephone will transmit a signal to the switch through the base station asking for the update of element e3 of the CAI information, which information would then be transmitted back to the mobile telephone. According to one alternative the phone will make a short call to a certain predetermined telephone number in the home network or any other predetermined network, during which call an updated value for e3 element will be transmitted back to the telephone. This certain number can be stored to the memory means of the telephone as a MENU-option, as a fast access number, or the user may dial said predetermined number for the update each time he or she wants to have an update.

The mobile telephone or the control means of the network may even be programmed to follow the changes in the exchange rates, and might be provided with a function of showing the changes within, for instance, the latest 24 hours, seven days etc, by the display means. The telephone may even be adapted to alarm if there are changes in rates which exceed a predetermined 'threshold' value for acceptable fluctuations in the exchange rates.

Thus, the invention provides an apparatus and a method by which a significant improvement can be achieved in the area of calculating exchange rates and estimating prices in various currencies. It should, however, be noted that the foregoing examples of the embodiments of the invention are not intended to restrict the scope of the invention defined in the appended claims.

What is claimed is:

1. A method for performing currency conversions, said method comprising the steps of:

entering the value of an amount in a first currency in control means of a receiver, retrieving a scaling factor from memory means of said receiver, said scaling factor describing a conversion between at least two different public land mobile network (PLMN) units, converting said amount of said first currency to an equivalent amount of a second currency by said control means adapted to use said scaling factor for the conversion, informing the user of the conversion result by means of a user interface of the receiver, and transmitting said scaling factor from a local PLMN to a mobile station, wherein said local PLMN analyzes the international mobile subscriber identity (IMSI) of the mobile station to receive required information including a mobile country code (MCC), a mobile network code (MNC) and a mobile subscriber identification number (MSIN) in order to be able to transmit a proper scaling factor to said mobile station.

2. A method according to claim 1, wherein the step of converting includes multiplying said amount of said first currency by said scaling factor so as to obtain said amount in terms of said second currency.

3. A method according to claim 1, wherein said scaling factor is transmitted to said mobile station as a part of an 'Advice of Charge' service (AoC).

4. A method according to claim 3, wherein said scaling factor is included in one element (e3) of seven information elements (e1 to e7) of a 'Charge Advice Information' (CAI) service.

5. A method according to claim 1, wherein said scaling factor is automatically updated by an updating service provided by at least one of the PLMNs providing said PLMN units.

6. A method according to claim 1, wherein the user requests an update of said scaling factor by selecting an appropriate MENU-option for the request.

7. A method according to claim 1, wherein the user requests an update of said scaling factor by making a telephone call to a predetermined telephone number adapted to provide an updating information as response to said call.

8. A method according to claim 1, wherein said receiver is a mobile station, the scaling factor is updated as a first telephone call is made in a local PLMN area after said mobile station has entered said area.

9. A method according to claim 1, wherein said first currency is entered to the mobile station control means through key means of the mobile station.

10. A method according to claim 1, wherein said first currency is entered to the mobile station control means through voice recognition means of the mobile station.

11. A method according to claim 1, wherein said first currency is entered to the mobile station control means through touch screen means of the mobile station.

12. A method according to claim 1, wherein said first currency is the currency of a country or an area in which the mobile station is at present connected to a local PLMN.

* * * * *

UNITED STATES PATENT AND TRADEMARK OFFICE
CERTIFICATE OF CORRECTION

PATENT NO : 6,065,673
DATED : May 23, 2000
INVENTOR(S) : Tapio Kokkila

It is certified that error appears in the above-identified patent and that said Letters Patent are hereby corrected as shown below:

Column 3, line 67    Replace "presen"
                     With --present--

Signed and Sealed this

Seventeenth Day of April, 2001

Attest:

NICHOLAS P. GODICI

Attesting Officer    Acting Director of the United States Patent and Trademark Office